US011649032B2

(12) United States Patent
Bullock et al.

(10) Patent No.: US 11,649,032 B2
(45) Date of Patent: May 16, 2023

(54) INTERIOR PANEL FOR AN INTERIOR OF A VEHICLE AND A METHOD FOR MAKING THE SAME

(71) Applicant: Gulfstream Aerospace Corporation, Savannah, GA (US)

(72) Inventors: John Bullock, Savannah, GA (US); Gregg Kendryna, Savannah, GA (US); Laburn DeBenion Saxon, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 214 days.

(21) Appl. No.: 16/949,182

(22) Filed: Oct. 19, 2020

(65) Prior Publication Data

US 2021/0114708 A1 Apr. 22, 2021

Related U.S. Application Data

(60) Provisional application No. 62/916,506, filed on Oct. 17, 2019.

(51) Int. Cl.
*B64C 1/06* (2006.01)
*B64D 47/02* (2006.01)

(52) U.S. Cl.
CPC .............. *B64C 1/066* (2013.01); *B64D 47/02* (2013.01)

(58) Field of Classification Search
CPC .. B64C 1/066; B60R 13/0237; B60R 13/0206
See application file for complete search history.

(56) References Cited

U.S. PATENT DOCUMENTS

| 2010/0154261 A1* | 6/2010 | Bozlo | G09F 21/049 |
| | | | 156/247 |
| 2010/0214798 A1* | 8/2010 | Salter | B60R 13/02 |
| | | | 362/520 |
| 2015/0210226 A1* | 7/2015 | Topart | B60R 13/02 |
| | | | 362/509 |

(Continued)

OTHER PUBLICATIONS

Bullock, John, et al., U.S. Appl. No. 16/568,051, filed Sep. 11, 2019.

(Continued)

*Primary Examiner* — Alexander K Garlen
(74) *Attorney, Agent, or Firm* — LKGlobal | Lorenz & Kopf, LLP

(57) ABSTRACT

Interior panels for an interior of a vehicle, vehicles, and methods for making interior panels for an interior of a vehicle are provided. In one example, the interior panel includes an outer covering having a first surface exposed to the interior and a second surface disposed opposite the first surface. The second surface has a pattern formed therein that is covered by the first surface. A board assembly is disposed proximate the second surface and has a third surface facing towards the second surface. The board assembly includes a light source that is generally aligned with the pattern. An adhesive layer is disposed between the second surface and the third surface and couples the second surface and the third surface together. When the light source generates light, the light passes through the adhesive layer and the pattern to produce an illuminated pattern on the first surface.

19 Claims, 5 Drawing Sheets

(56) References Cited

U.S. PATENT DOCUMENTS

| | | | |
|---|---|---|---|
| 2015/0274066 A1* | 10/2015 | Del Pozo Gonzalez | ................... |
| | | | B60Q 3/64 |
| | | | 362/551 |
| 2016/0373110 A1* | 12/2016 | Koehne | ................... F21V 23/04 |
| 2017/0269774 A1* | 9/2017 | Ben Abdelaziz | ....... B60R 13/02 |
| 2017/0291536 A1* | 10/2017 | Cannon | ................... B32B 9/047 |
| 2020/0130839 A1* | 4/2020 | Hahn | ................... G06F 3/0443 |
| 2020/0369223 A1* | 11/2020 | Hansen | ................ G06F 3/0412 |
| 2021/0024196 A1* | 1/2021 | Sethapun | ............... B64D 47/02 |
| 2021/0070153 A1* | 3/2021 | Bullock | ............... H03K 17/955 |
| 2021/0070446 A1* | 3/2021 | Spencer | ................ B64D 11/00 |
| 2021/0107400 A1* | 4/2021 | Erler | ..................... B60Q 3/217 |

OTHER PUBLICATIONS

Spencer, Stephen et al., U.S. Appl. No. 16/568,026, filed Sep. 11, 2019.

* cited by examiner

INTERIOR PANEL FOR AN INTERIOR OF A VEHICLE AND A METHOD FOR MAKING THE SAME

CROSS-REFERENCE TO RELATED APPLICATIONS

This application is related to and claims all available benefit of U.S. Provisional Patent Application 62/916,506 filed Oct. 17, 2019, the entire contents of which are herein incorporated by reference.

TECHNICAL FIELD

The technical field relates generally to interior panels for a vehicle, and more particularly, relates to interior panels integrated with hidden illuminable patterns and/or hidden illuminable controls for an interior of a vehicle, vehicles including such interior panels, and methods for making such interior panels.

BACKGROUND

Many vehicles have interiors that include interior panels. These interior panels, for example, are disposed in and/or form at least a portion(s) of the interior. Interior panels can be utilized, for example, to house, store, and/or arrange mechanisms, electrical components, electrical equipment, devices, or the like to protect and/or cover them so they are not visible from the interior of the vehicle.

To arrange items such as an electronic device or equipment item behind an interior panel, it is often necessary to provide, for example, an enclosure, a cavity, a space, an area, or the like to house the item between the interior panel and another structure, such as, for example, an exterior panel, an intervening panel or structure, or the like. In such cases, the thickness of the interior panel may need to be locally thinned to provide sufficient room to arrange the item.

Unfortunately, thinning interior panels that include an exterior surface layer formed of, for example, a decorated layer, wood, wood-like material, plastic, or the like can cause the exterior surface layer of the interior panel to warp, bubble, discolor, or otherwise become aesthetically compromised over time as well as create other underlying issues. For example, an interior panel having a thinned back side may cause warping, bubbling, or discoloration of a decorative exterior surface overlaying the thinned back side. This may disrupt the otherwise pleasing appearance of the exterior surface. Further, this may also result in causing functional and/or other issues with any underlying electronic device(s) or equipment item(s) that may be arranged in the locally thinned back side of the panel and/or with the functioning of the interior panel itself.

Accordingly, it is desirable to provide an interior panel for an interior of a vehicle that addresses one or more of the foregoing issues, a vehicle including such an interior panel (s), and a method for making such an interior panel(s). Furthermore, other desirable features and characteristics of the various embodiments described herein will become apparent from the subsequent detailed description and the appended claims, taken in conjunction with the accompanying drawings and this background.

SUMMARY

Various non-limiting embodiments of an interior panel for an interior of a vehicle, a vehicle, and a method for making an interior panel for an interior of a vehicle are provided herein.

In a first non-limiting embodiment, the interior panel includes, but is not limited to, an outer covering having a first surface that is configured to be exposed to the interior of the vehicle and a second surface that is disposed opposite the first surface. The second surface has a pattern formed therein that is covered by the first surface. The interior panel further includes, but is not limited to, a board assembly that is disposed proximate the second surface and that has a third surface that faces towards the second surface. The board assembly includes a light source that is generally aligned with the pattern and that is operative to generate light. The interior panel further includes, but is not limited to, an adhesive layer that is disposed between the second surface and the third surface and that couples the second surface and the third surface together. When the light source generates the light, the light passes through the adhesive layer and the pattern to produce an illuminated pattern on the first surface.

In another non-limiting embodiment, the vehicle includes, but is not limited to, a vehicle structure having an interior. The vehicle further includes, but is not limited to, an interior panel that is disposed in the interior. The interior panel includes an outer covering having a first surface that is exposed to the interior and a second surface that is disposed opposite the first surface. The second surface has a pattern formed therein that is covered by the first surface. A board assembly is disposed proximate the second surface and has a third surface that faces towards the second surface. The board assembly includes a light source that is generally aligned with the pattern and that is operative to generate light. An adhesive layer is disposed between the second surface and the third surface and couples the second surface and the third surface together. When the light source generates the light, the light passes trough the adhesive layer and the pattern to produce an illuminated pattern on the first surface.

In another non-limiting embodiment, the method includes, but is not limited to, obtaining an outer covering having a first surface that is configured to be exposed to the interior of the vehicle and a second surface that is disposed opposite the first surface and that has a pattern formed therein that is covered by the first surface. The method further includes, but is not limited to, obtaining a board assembly that includes a light source that is operative to generate light. The method further includes, but is not limited to, coupling a third surface of the board assembly to the second surface with an adhesive layer. The light source is generally aligned with the pattern. When the light source generates the light, the light passes through the adhesive layer and the pattern to produce and illuminated pattern on the first surface.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
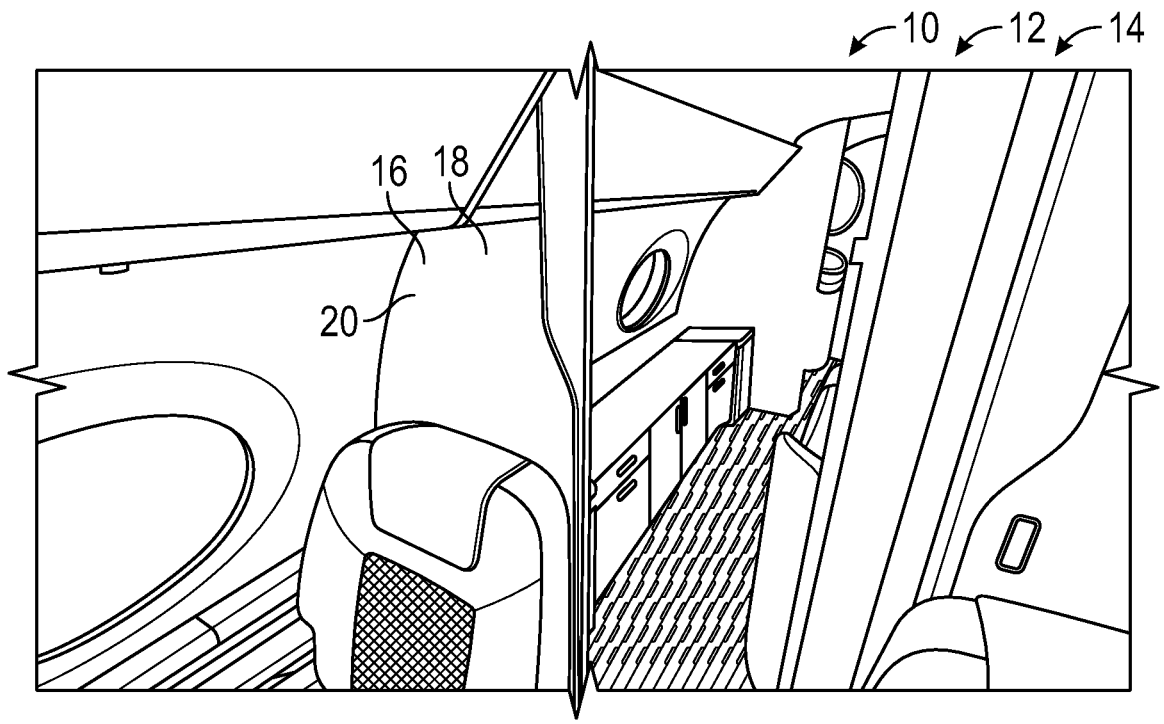
FIG. 1 illustrates a perspective view of a portion of a vehicle interior including an interior panel in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to interior panels for interiors of vehicles, vehicles including interior panels, and methods for making interior panels for interiors of vehicles. The exemplary embodiments taught herein provide a vehicle having a vehicle structure. The vehicle structure has an interior with an interior panel disposed therein. The interior panel includes an outer covering having a first surface that is exposed to the interior and a second surface that is disposed opposite the first surface. In an exemplary embodiment, the first surface of the outer covering is a relatively smooth, aesthetically pleasing continuous surface. The second surface of the outer covering is locally milled, cut, machined, etched, carved, engraved, or otherwise thinned to locally reduce the wall stock in at least a portion of the outer covering without affecting or otherwise removing any material from the first surface to form a pattern in and/or on the second surface that is covered by the first surface.

A board assembly is disposed proximate the second surface of the outer covering. The board assembly has a third surface that faces towards the second surface. The board assembly further includes a light source that is generally aligned with the pattern and is operative to generate light.

An adhesive layer is disposed between the second surface and the third surface and couples the second and third surfaces together. For example, the adhesive layer bonds the second and third surfaces together. When the light source generates the light, the light passes through the adhesive layer and the pattern to produce an illuminated pattern on the first surface. In an exemplary embodiment, the illuminated pattern corresponds to the pattern.

In an exemplary embodiment, advantageously, by disposing the adhesive layer between the second surface of the outer covering and the third surface of the board assembly and coupling the second surface of the outer covering to the third surface of the board assembly with the adhesive layer, the outer covering is mechanically strengthened to resist warping, bubbling, and/or discoloring of the outer covering over time. Additionally, in an exemplary embodiment, advantageously the adhesive is relatively transparent or translucent allowing sufficient light to pass through the adhesive and the pattern, thereby enabling the interior panel to produce a clearly visible illuminated pattern on the first surface. Hence, the locally thinned second surface of the outer covering is reinforced to ensure the craftmanship of the interior panel while also maintaining functionality of producing a clearly visible illuminated pattern on the first surface.

Referring to FIG. 1, a vehicle 10 including a vehicle structure 12 in accordance with an exemplary embodiment is provided. In an exemplary embodiment, the vehicle 10 is an aircraft including an aircraft structure as the vehicle structure 12. The vehicle structure 12 is, for example, a fuselage that surrounds or otherwise has an interior 14 with an interior panel 16 disposed therein. Although the interior 14 of the vehicle 10 is illustrated as having the interior panel 16, it should be understood that the interior 14 of the vehicle 10 may include any number of interior panels in addition to the interior panel 16.

The interior panel 16 includes an outer covering 18 that has a front covering surface 20 (e.g., first surface) that is exposed to the interior 14 of the vehicle 10. In an exemplary embodiment, the outer covering 18 includes or is made of wood and/or wood veneer, a plastic or polymeric material, a composite or laminated material, for example a wood-plastic composite or wood-plastic laminated construction, a stone veneer, a mirror, a fabric covered panel, a painted panel, a decorated or aesthetically pleasing construction, and/or the like. In an exemplary embodiment, the outer covering 18 includes a veneer that includes the front covering surface 20 and that is laminated to or otherwise overlaid on a backing material or substrate.

Figure 2:
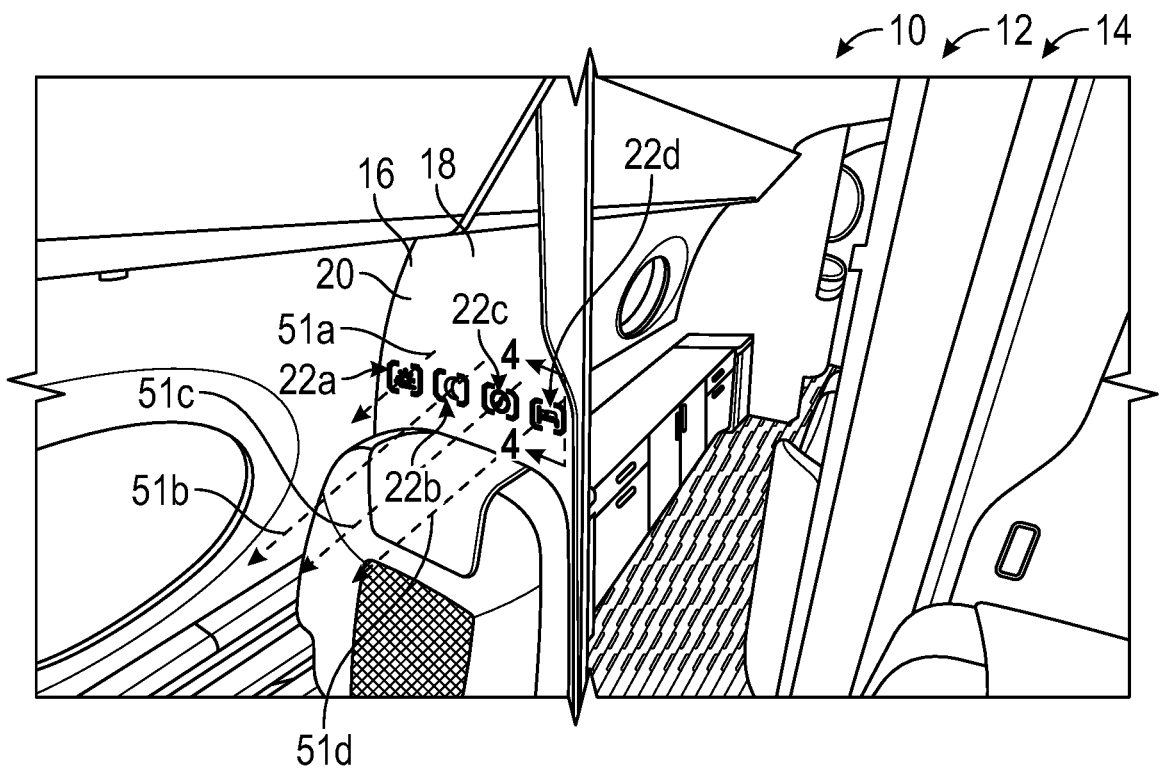
FIG. 2 illustrates a perspective view of a portion of a vehicle interior including an interior panel having illuminated patterns in accordance with an exemplary embodiment.

Referring also to FIG. 2, the interior panel 16 is operative to selectively and independently display illuminated patterns 22a-d on the front covering surface 20. Although the interior panel 16 is illustrated as being operative to selectively and independently display illuminated patterns 22a-d that correspond to four distinct illuminated patterns, various alternate embodiments of the interior panel 16 may include the interior panel 16 being operative to selectively and independently display less than four illuminated patterns but at least one illuminated pattern, or to more than four illuminated patterns. When displayed, each of the illuminated patterns 22a-d are independently visible on the front covering surface 20 of the outer covering 18 due to light rays 51a-d that project from the interior panel 16 towards the interior 14 as will be discussed in further detail below.

Figure 3:
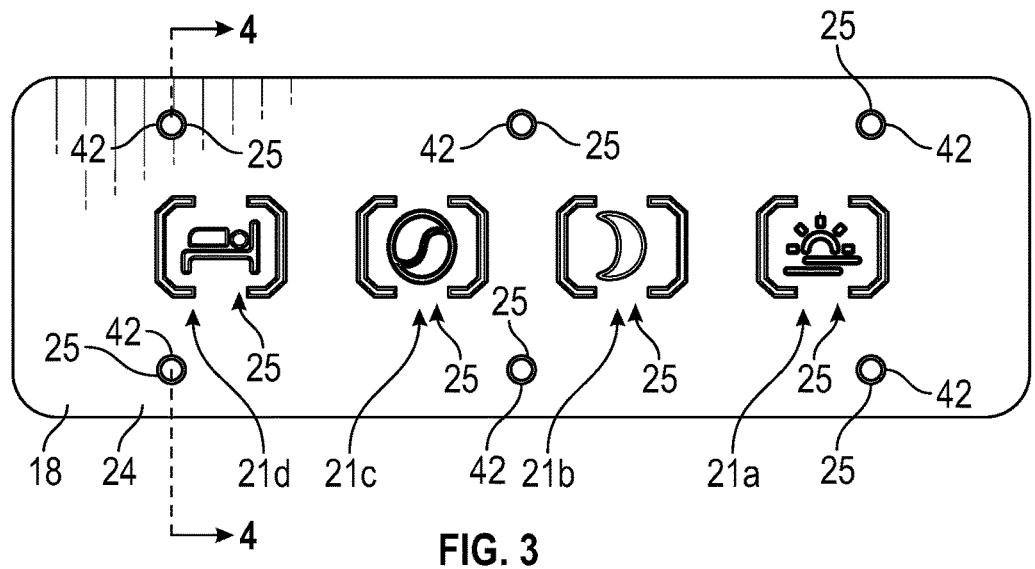
FIG. 3 illustrates a rear view of an outer covering of an interior panel that has a locally reduced wall stock in accordance with an exemplary embodiment.

Referring also to FIG. 3, the outer covering 18 has a back covering surface 24 (e.g., second surface) that is disposed opposite the front covering surface 20 facing, for example, into or towards an inside or interior portion of the interior panel 16. As such, the back covering surface 24 of the outer covering 18 is not exposed to the interior 14 of the vehicle 10.

In an exemplary embodiment, the back covering surface 24 of the outer covering 18 includes a locally reduced wall stock 25 that defines patterns 21a-d in the back covering surface 24 that are hidden from the front covering surface 20 and are therefore not visible from the interior 14 of the vehicle 10. For example, the patterns 21a-d are covered from the interior 14 by the front covering surface 20 of the outer covering 18. Although the locally reduced wall stock 25 is illustrated as forming patterns 21a-d, it should be understood that alternate embodiments of the interior panel 16 include the locally reduced wall stock 25 as forming any shape, design, pattern, or the like that reduces the wall stock of at least a portion of the outer covering 18. In an exemplary embodiment, the patterns 21a-d are milled, cut, machined, etched, carved, engraved, or otherwise formed into the back covering surface 24 of the outer covering 18 to locally reduce the wall stock in the outer covering 18 without affecting or otherwise removing any material from the front covering surface 20. In an exemplary embodiment, the outer covering 18 has a nominal wall stock of from about 1 to about 4 mm, for example about 1.5 mm, and a localized reduced wall stock of from about 0.2 to about 1 mm, such as about 0.25 to about 1 mm or about 0.2 to about 0.25 mm, such as about 0.25 mm that defines the patterns 21*a-d*. In an exemplary embodiment, the back covering surface 24 further includes locally reduced wall stock 25 that forms relief hole(s) 42 that will be discussed in further detail below.

In an exemplary embodiment, the patterns 21*a-d* correspond to the shapes of the illuminated patterns 22*a-d*, respectively, of the front covering surface 20 of the outer covering 18. As used herein, the term "correspond" refers to articles or patterns having similar, substantially matching, or matching shapes, forms, alignment, and/or structures. In an exemplary embodiment, the illuminated patterns 22*a-d* are generally aligned with the patterns 21*a-d*. As used herein, the phrase "generally aligned" refers to articles and/or patterns that are arranged, oriented, and/or positioned relative to one another in a linear or substantially linear fashion.

Figure 4:
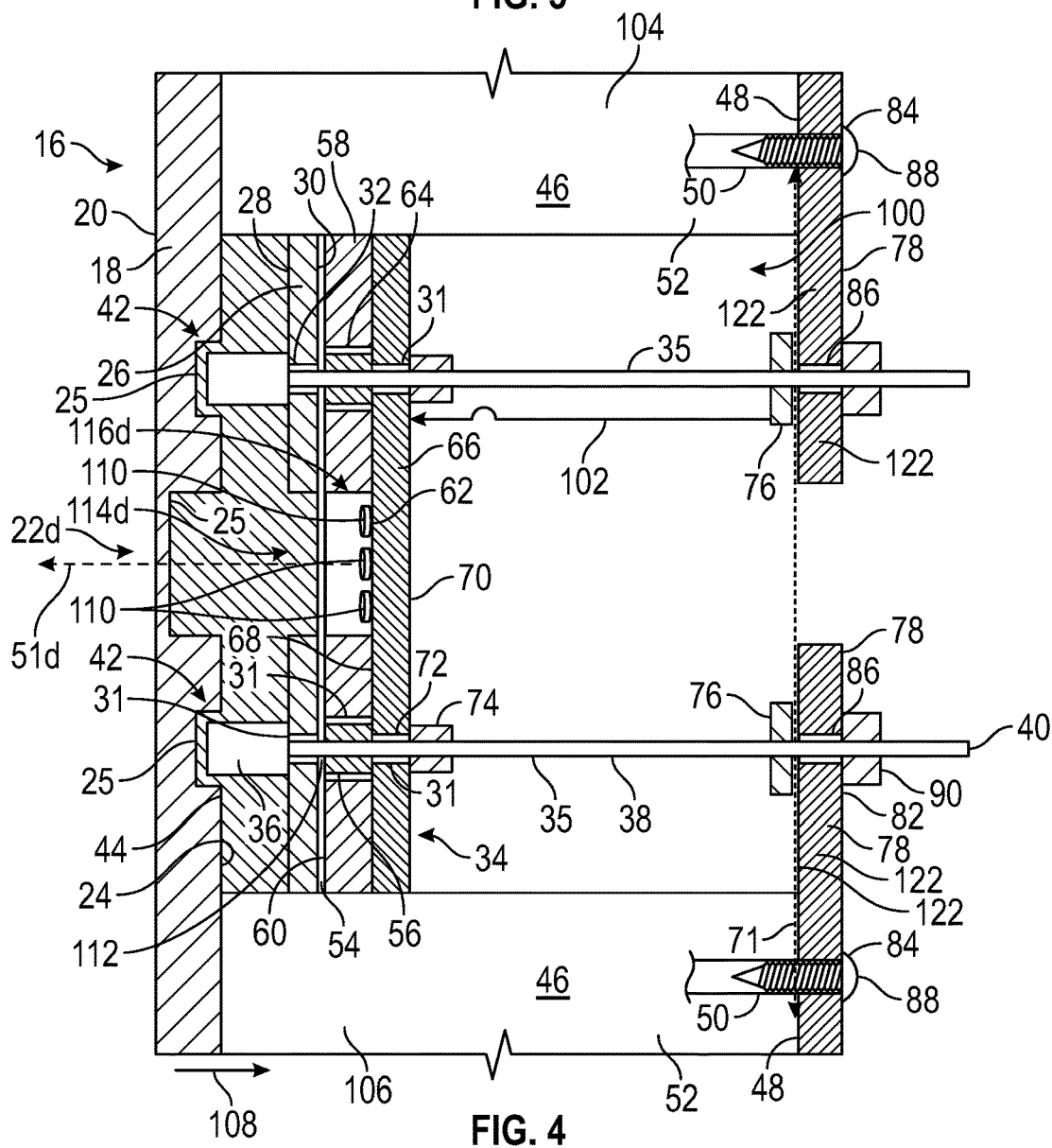
FIG. 4 illustrates a cross-section of the interior panel depicted in FIG. 2 along the line 4-4.

FIG. 4 illustrates a cross-section of the interior panel 16 of FIG. 2 along the line 4-4. The interior panel 16 includes a backing structure 46 that surrounds an opening 100 formed therein. For example, the backing structure 46 includes sidewalls 104 and 106 that each extends transversely from the back covering surface 24 in a direction 108 opposite the front covering surface 20 and are spaced apart from each other to define the opening 100. In an exemplary embodiment, the opening 100 has been cut, milled, machined or otherwise formed into the backing structure 46, thereby forming a locally cut-out area in the interior panel 16. In an exemplary embodiment, the opening 100 is defined by the back covering surface 24 and the backing structure 46. As illustrated, the backing structure 46 supports the outer covering 18 except in the locally cut-out area that defines the opening 100. In an exemplary embodiment, the backing structure 46 is a relatively lightweight rigid structure, such as a honeycomb structure (e.g., Nomex® honeycomb structure), lightweight composite structure, or the like.

The interior panel 16 includes a board stack-up assembly 34 (e.g., board assembly) that is disposed in the opening 100 proximate the back covering surface 24. The board stack-up assembly 34 has a front board surface (e.g., third surface) 28 and a back board surface 70 (e.g., fourth surface) disposed in the direction 108 opposite the front board surface 28. The front board surface 28 is disposed proximate to and facing towards the back covering surface 24. As illustrated, the board stack-up assembly 34 includes a first panel 26, a layer 54, a second panel 58, and a third panel 66. However, it is to be understood that various alternate embodiments of the board stack-up assembly 34 include the board stack-up assembly 34 having no layer 54, a plurality of layers 54, a singular panel 26, 58, or 66, a pair of panels 26, 58, and/or 66, or more than three panels so long as the board stack-up assembly 34 has a front board surface 28 and a back board surface 70.

An adhesive layer 44 is disposed between the front board surface 28 and the back covering surface 24. The adhesive layer 44 couples the back covering surface 24 of the outer covering 18 to the front board surface 28 of the board stack-up assembly 34. In an exemplary embodiment, the adhesive layer 44 is formed of a non-ferrous adhesive. In an exemplary embodiment, the adhesive layer 44 is not opaque but rather is translucent and/or transparent to allow light to pass through. Non-limiting examples of adhesive include thermoplastic adhesives for example hot melt adhesives such as polyolefin (e.g., HDPE or the like) or the like, thermosetting adhesives for example acrylic adhesives, epoxy adhesives, polyurethane adhesives, or the like.

The board stack-up assembly 34 includes a light source(s) 110 that is operative to produce light (indicated by light rays 51*a-d*). The light source(s) 110 are matched and generally aligned with the patterns 21*a-d*. When the light source(s) 110 generate the light rays 51*a-d*, the light passes through the adhesive layer 44 and the patterns 21*a-d* to produce the illuminated patterns 22*a-d*. As such, it is to be understood that the adhesive layer 44 is disposed between the light source(s) 110 and the back covering surface 24. In an exemplary embodiment, the light source(s) 110 are disposed in the board stack-up assembly 34 between the front board surface 28 and the back board surface 70. Additionally, when the light source(s) 110 are prevented from or otherwise not generating a respective light ray(s) 51*a*, 51*b*, 51*c*, and/or 51*d*, then the corresponding illuminated pattern(s) 22*a*, 22*b*, 22*c*, and/or 22*d* is not produced on the front cover surface 20. As such, the light source(s) 110 are operative to independently and selectively produce the illuminated patterns 22*a-d*.

The board stack-up assembly 34 has a through-hole(s) 31 that extends from the front board surface 28 to the back board surface 70 and includes a fastener(s) 35 such as, for example, screws, bolts, or other threaded fasteners, or the like disposed therein. The fastener(s) 35 each have a fastener head (e.g., head portion) 36 and a fastener shaft or body (e.g., shaft portion) 38 including a fastener body end portion 40. The fastener head 36 is disposed between the back covering surface 24 and the front board surface 28, generally aligned with a relief hole 42 and abutted against the front board surface 28. As such, the relief hole(s) 42 allow the board stack-up assembly 34 to be disposed proximate the back covering surface 24. The fastener shaft 38 extends front the fastener head 36 in the direction 108 through the through-hole 31. As illustrated, the through-hole(s) 31 extend through the first panel 26, the layer 54, the second panel 58, and the third panel 66. As such and as will be discussed in further detail below, each of the first panel 26, the layer 54, the second panel 58, and the third panel 66 includes hole(s) that substantially align with the hole(s) of the other panels and/or layers of the board stack-up assembly 34 to form the through-hole(s) 31. In an exemplary embodiment, the adhesive layer 44 is disposed between the fastener head(s) 36 and the back covering surface 24.

In an exemplary embodiment, the board stack-up assembly 34 further includes fastener(s) 74 such as, for example, washers, nuts, or the like that are disposed on and in threaded engagement with the fastener body/bodies 38 of the fastener(s) 35 between the back board surface 70 and the fastener body end portion(s) 40. The fastener(s) 74 are abutted against the back board surface 70. As such, the fastener(s) 74 and the fastener head(s) 36 keep the panel(s) and/or layer(s) of the board stack-up assembly 34 secured together and properly aligned.

Figure 5:
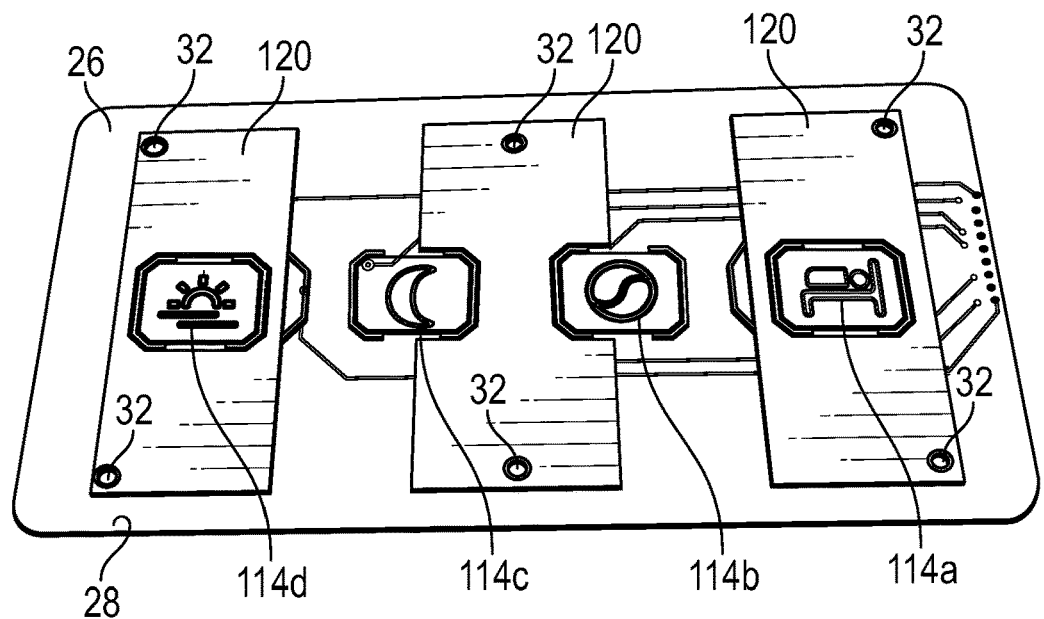
FIG. 5 illustrates a perspective view of a front surface of a first panel in accordance with an exemplary embodiment.

Referring to FIGS. 4 and 5, the first panel 26 has a first panel front surface 28 (e.g., front board surface) and a first panel back surface 30 disposed opposite the first panel front surface 28 and includes hole(s) 32 that form at least a part of the through hole(s) 31. In an exemplary embodiment, the first board 26 has refining patterns 114*a-d* formed therethrough that generally align with the corresponding patterns 21*a-d*. The refining patterns 114*a-d* are milled, cut, machined, etched, carved, engraved, or otherwise formed through the first board 26, thereby allowing the light rays 51a-d to pass therethrough. As such, it is to be understood that the adhesive layer 44 may be disposed in the refining patterns 114a-d in addition to being disposed between the back covering surface 24 and the first panel front surface 28.

Figure 6:
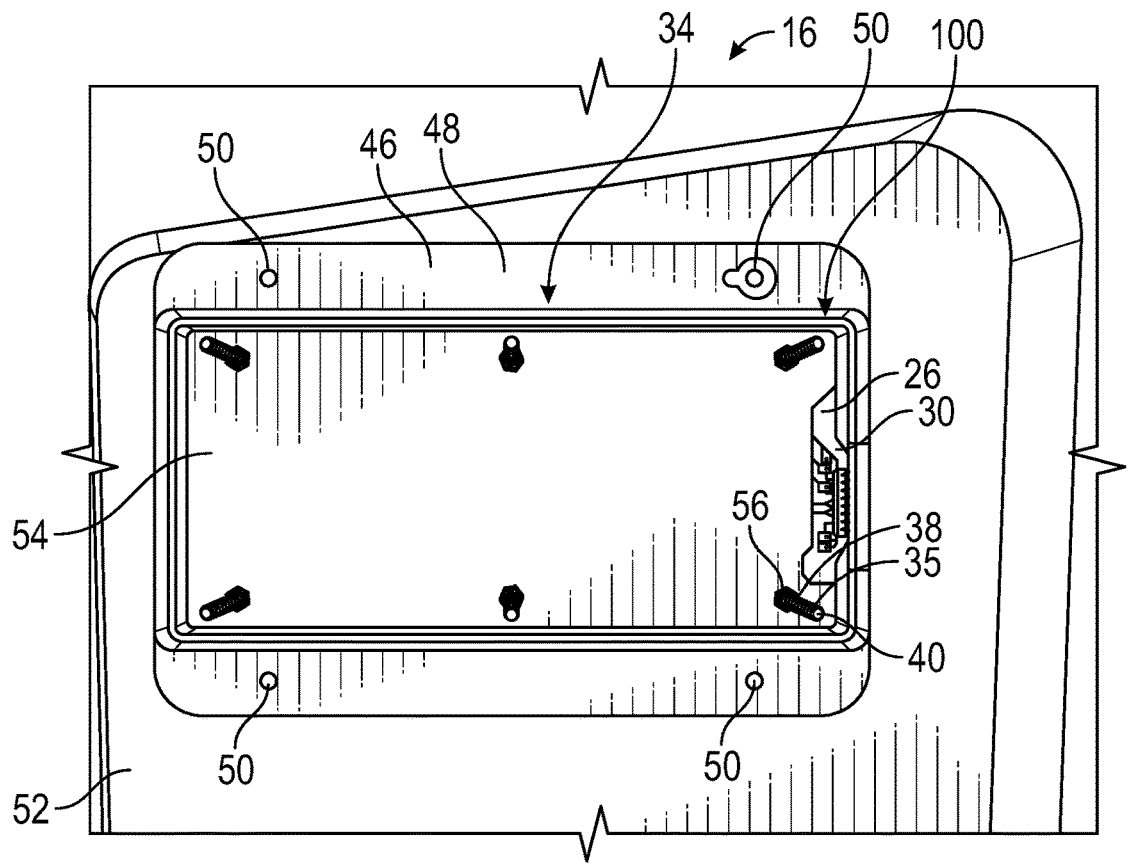
FIG. 6 illustrates a rear view of an interior panel including the first panel, a first film, and a first set of fasteners in accordance with an exemplary embodiment.

Referring to FIGS. 4 and 6, the board stack-up assembly 34 includes the layer (also referred to herein as "film layer") 54 disposed adjacent to the first panel back surface 30. The film layer 54, for example, is a colored layer that alters the color of light that passes therethrough. The film layer 54 is disposed between the light source(s) 110 and the back covering surface 24, and therefore alters the color of light rays 51a-d produced by the light source(s) 110 and, further, alters the color of the illuminated patterns 22a-d. In an exemplary embodiment, the film layer 54 is not opaque but rather is transparent and/or translucent to allow light to pass therethrough. The film layer 54 has hole(s) 112 formed therethrough that are correspondingly aligned with the hole (s) 32 and form at least a portion of the through-hole(s) 31.

The board stack-up assembly 34 further includes fastener (s) 56 disposed on the fastener body/bodies 38 between the first panel 26 and the fastener body end portion(s) 40. The fastener(s) 56 are, for example, nuts, washers, and/or the like. As illustrated, the fastener(s) 56 have a larger outer diameter than the holes 32 of the first panel 26.

Figure 7:
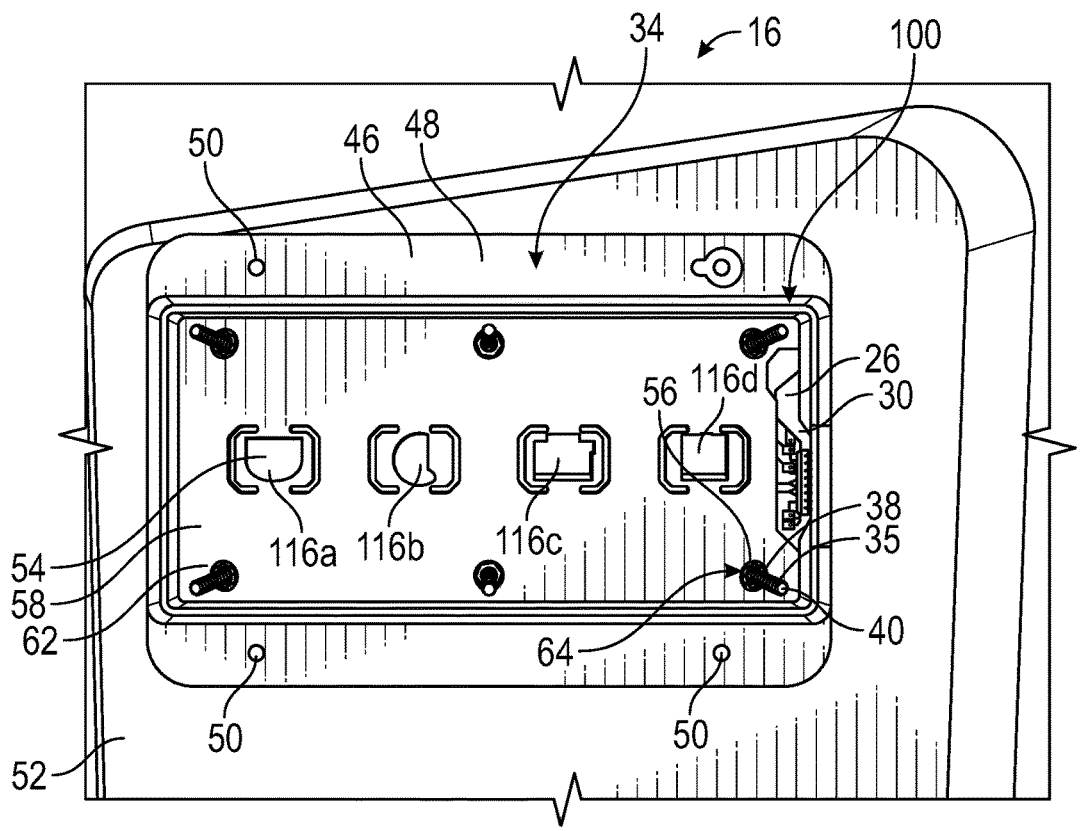
FIG. 7 illustrates a rear view of an interior panel including a second panel in accordance with an exemplary embodiment.

Referring to FIGS. 4 and 7, the board stack-up assembly 34 includes a second panel 58 that has a second panel front surface 60 disposed adjacent to the film layer 54 and a second panel back surface 62 opposite the second panel front surface 60. In an exemplary embodiment, the second panel front surface 60 is opaque, black, and/or otherwise able to prevent light from passing therethrough. The second panel 58 has masking patterns 116a-d formed therethrough that matched and generally align with the refining patterns 114a-d, the patterns 21a-d, and the illuminated patterns 22a-d. The masking patterns 116a-d are milled, cut, machined, etched, carved, engraved, or otherwise formed through the second panel 58, thereby allowing the light rays 51a-d to pass therethrough. The second panel 58 includes hole(s) 64 formed therethrough that are correspondingly aligned with the hole(s) 112 and 32 and form at least a portion of the through-hole(s) 31. As illustrated, the diameter of the hole(s) 64 is larger than the diameter of the fastener(s) 64, and therefore the fastener(s) 64 can be accommodated in the hole(s) 64 without any interference issues.

Figure 8:
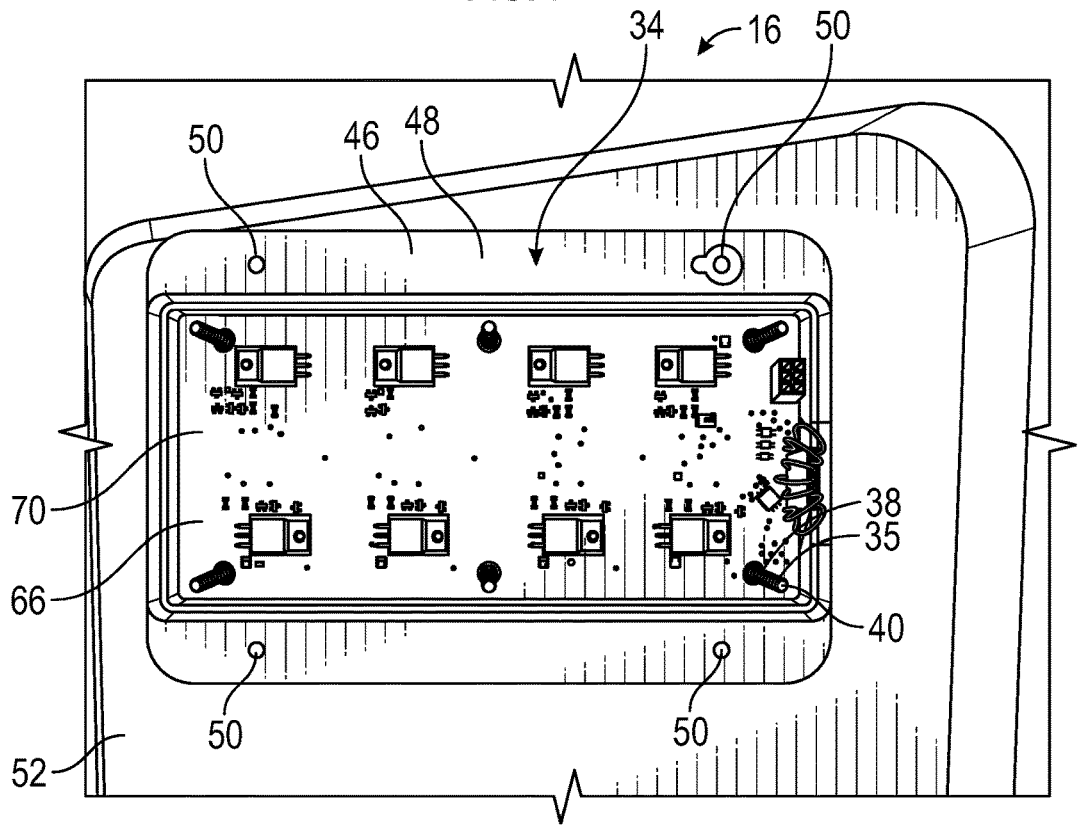
FIG. 8 illustrates a rear view of an interior panel including a third panel in accordance with an exemplary embodiment.

Referring to FIGS. 4 and 8, the board stack-up assembly 34 includes a third panel 66 that has a third panel front surface 68 disposed adjacent to the second panel back surface 62 and a third panel back surface 70 (e.g., back board surface) that is opposite the third panel front surface 68. In an exemplary embodiment, the light source(s) 110 are disposed on the third panel front surface 68 matched and generally aligned with the masking patterns 116a-d, the refining patterns 114a-d, the patterns 21a-d, and the illuminated patterns 22a-d. The third panel 66 includes hole(s) 72 formed therethrough. As illustrated, the hole(s) 72 of the third panel 66 have a diameter that is less than the outer diameter of the fastener(s) 56 while the hole(s) 64 of the second panel 58 have a diameter that is substantially equal to or greater than the outer diameter of the fastener(s) 56. The fastener body/bodies 38 of the fastener(s) 35 are disposed in the hole(s) 72 of the third panel 66. The hole(s) 72 of the third panel 66 have a diameter that is substantially equal to or greater than the diameter of the fastener body/ bodies 38.

Figure 9:
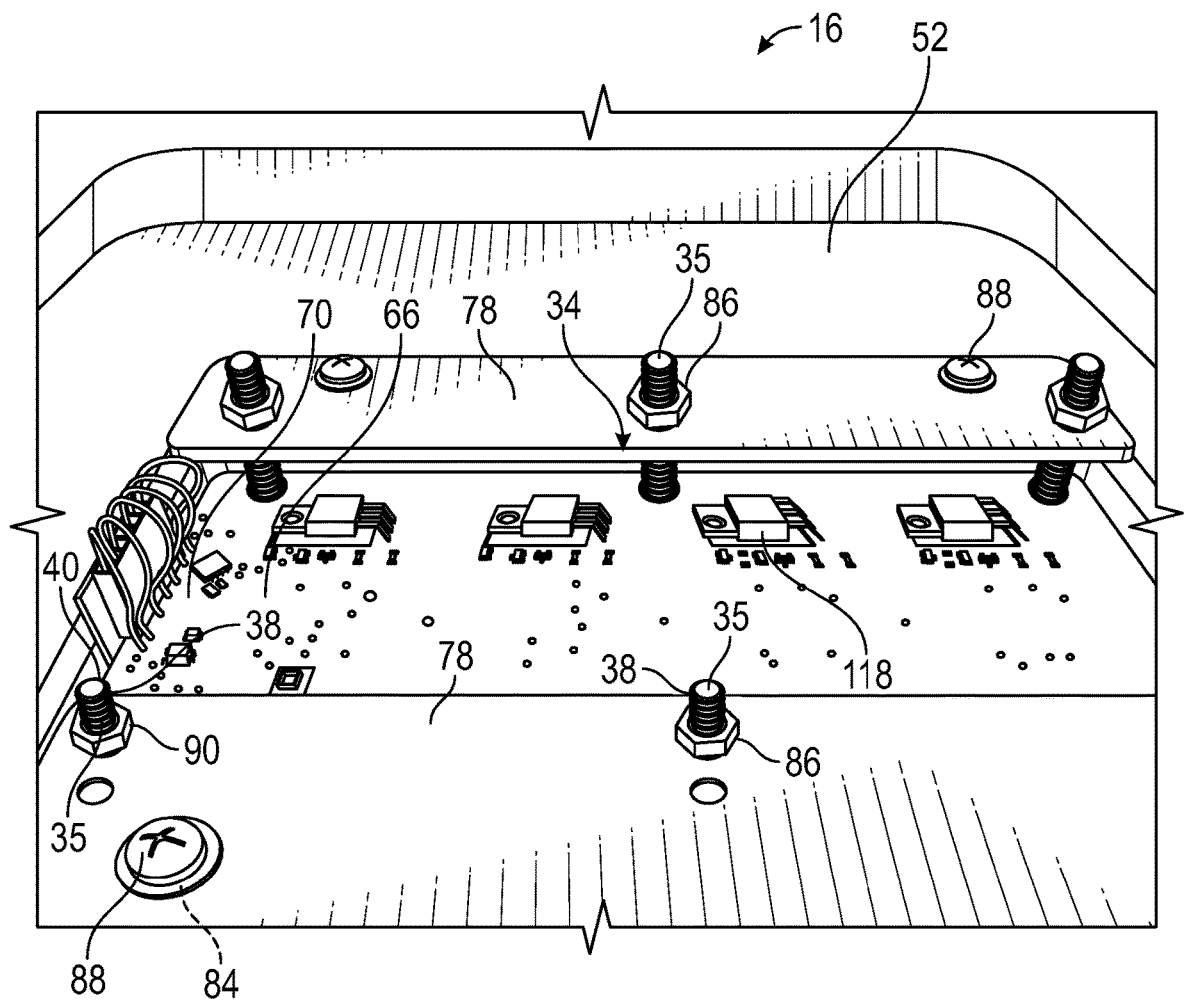
FIG. 9 illustrates a perspective rear view of an interior panel including a backing panel in accordance with an exemplary embodiment.

Referring to FIGS. 4 and 9, the backing structure 46 has a backing structure back surface 48 that includes hole(s) 50 formed therein that surround the board stack-up assembly 34 in the sidewall(s) 104 and/or 106. As illustrated, the backing structure 46 has a backing portion 52 that includes the backing structure back surface 48 and that defines the hole(s) 50.

In an exemplary embodiment, the interior panel 16 includes fastener(s) 76 such as, for example, washers, nuts, or the like that are disposed on and in threaded engagement with the fastener body/bodies 38 of the fastener(s) 35 between the fastener(s) 74 and the fastener body end portion (s) 40. In an exemplary embodiment, the fastener(s) 76 are substantially flush with the backing structure back surface 48 along the plane (indicated by double-headed dashed arrow 71), thereby defining a gap (indicated by single headed arrow 102) between the board stack-up assembly 34 and the fastener(s) 76.

As illustrated, the interior panel 16 includes a backing panel(s) 78 that is disposed on the backing structure back surface 48 of the backing structure 46 coupled to at least one of the sidewalls 104 and 106 and extends at least partially over the opening 100 spaced apart from but covering at least a portion of the board stack-up assembly 34. For example, the backing panel(s) 78 include an overhang backing panel portion 122 that covers at least part of the opening 100. In an exemplary embodiment, the backing panel(s) 78 is formed of a relatively rigid structure formed of a rigid material, such as a plastic material, metal, composite material, or the like.

The backing panel(s) 78 has a backing panel front surface 80 (e.g., fifth surface) that is disposed on the backing structure 46 and/or facing the third panel 66 and a backing panel back surface 82 (e.g., sixth surface) that is disposed opposite the backing panel front surface 80. The backing panel(s) 78 includes hole(s) 84 and hole(s) 86 formed therethrough. In an exemplary embodiment, the overhang backing panel portion 122 includes the hole(s) 86. The hole(s) 84 of the backing panel(s) are matched and aligned with the hole(s) 50 of the backing structure 46. The interior panel 16 includes fastener(s) 88 such as, for example, screws, bolts, or other threaded fasteners or the like that extend through the hole(s) 84 of the backing panel(s) 78 and the hole(s) 50 of the backing structure 46 to engage the backing structure 46.

As illustrated, the fastener body/bodies 38 of the fastener (s) 35 are disposed in the hole(s) 86 of the backing panel(s) 78. In an exemplary embodiment, the backing panel(s) 78 is disposed on or immediately adjacent to the backing structure 46. The backing panel(s) 78 is disposed between the third panel back surface 70 and the fastener body end portion(s) 40. The interior panel 16 further includes fastener(s) 90 disposed on and engaging the fastener body/bodies 38 of the fastener(s) 35 between the backing panel(s) 78 and the fastener body end portion(s) 40. In an exemplary embodiment, the fastener(s) 90 are nuts, washers, or the like. As such, advantageously this attachment scheme, in addition to the adhesive layer 44, helps the board stack-up assembly 34 to locally support the outer covering 18 over the locally cut-out area that defines the opening 100 formed in the backing structure 46 by supporting the stack-up assembly 34 with the fastener(s) 35 that is secured to the backing panel(s) 78, which is anchored to the backing structure 46.

In an exemplary embodiment, the light source(s) 110 may be in electrical communication with a controller(s) 118 to receive a command signal that directs the light source(s) 110a-d to generate light rays 51a-d. With reference to FIG.

5, in an exemplary embodiment, the board stack-up assembly 34 may include capacitive sensor(s) 120 that are in communication with the controller(s) 118 to direct the controller(s) 118 to communicate the command signal to the light source(s) 110 in response to capacitance change of the capacitive sensor(s) 120. For example, the capacitive sensor(s) 120 are generally aligned with the illuminated patterns 22*a-d* and when a person places, for example, a finger near the area of the front covering surface 20 where the illuminated patterns 22*a-d* are configured to be generated, the capacitive sensor(s) 120 detect a change in capacitance and direct the controller(s) 118 to direct the light source(s) 110 to generate the illuminated pattern(s) 22*a-d*.

Figure 10:
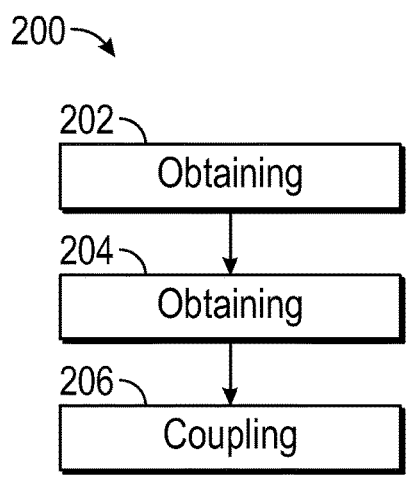
FIG. 10 illustrates a block diagram of a method for making an interior panel for an interior of a vehicle in accordance with an exemplary embodiment.

Referring to FIG. 10, a method 200 for making an interior panel for an interior of a vehicle in accordance with an exemplary embodiment is provided. The method includes obtaining (STEP 202) an outer covering having a first surface that is configured to be exposed to the interior of the vehicle and a second surface that is disposed opposite the first surface and that has a pattern formed therein that is covered by the first surface. A board assembly is obtained (STEP 204) and includes a light source that is operative to generate light. A third surface of the board assembly is coupled (STEP 206) to the second surface with an adhesive layer. The light source is generally aligned with the pattern. When the light source generates the light, the light passes through the adhesive layer and the pattern to produce an illuminated pattern on the first surface.

In an exemplary embodiment, coupling (STEP 206) includes disposing an adhesive between the second surface and the third surface. In an exemplary embodiment, coupling (STEP 206) includes drying and/or curing the adhesive to form the adhesive layer. In an exemplary embodiment, coupling (STEP 206) includes forming the adhesive layer as one of a translucent adhesive layer, a transparent adhesive layer, and a combination thereof.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel for an interior of a vehicle, the interior panel comprising:
   an outer covering having a first surface that is configured to be exposed to the interior of the vehicle and a second surface that is disposed opposite the first surface, wherein the second surface has a pattern formed therein that is covered by the first surface;
   a board assembly that is disposed proximate the second surface and that has a third surface that faces towards the second surface, wherein the board assembly includes a light source that is generally aligned with the pattern and that is operative to generate light; and
   an adhesive layer that is disposed between the second surface and the third surface and that couples the second surface and the third surface together, wherein when the light source generates the light, the light passes through the adhesive layer and the pattern to produce an illuminated pattern on the first surface,
   wherein the interior panel includes a first sidewall and a second sidewall that each extend transversely from the second surface in a direction opposite the first surface and that are spaced apart from each other to define an opening therebetween, and wherein the board assembly and the adhesive layer are disposed in the opening.

2. The interior panel of claim 1, wherein the illuminated pattern corresponds to the pattern.

3. The interior panel of claim 1, wherein the adhesive layer is one of a translucent adhesive layer, a transparent adhesive layer, and a combination thereof.

4. The interior panel of claim 1, wherein the adhesive layer is formed of a non-ferrous adhesive.

5. The interior panel of claim 1, wherein the board assembly has a fourth surface that is disposed opposite the third surface, and wherein the light source is disposed between the third surface and the fourth surface.

6. The interior panel of claim 5, wherein the board assembly has a through-hole that extends from the third surface to the fourth surface, and wherein the board assembly further includes a first fastener disposed in the through-hole.

7. The interior panel of claim 6, wherein the first fastener includes a head portion and a shaft portion that extends from the head portion, and wherein the head portion is disposed between the second surface and the third surface abutted against the third surface, and wherein the shaft portion extends from the head portion adjacent to third surface through the through-hole.

8. The interior panel of claim 7, wherein the board assembly further includes a second fastener that is abutted against the fourth surface and that is disposed about and engages the shaft portion of the first fastener.

9. The interior panel of claim 8, wherein the interior panel includes a backing panel that is coupled to at least one of the first sidewall and the second sidewall, wherein the backing panel has an overhang backing panel portion that covers at least part of the opening between the first sidewall and the second sidewall and is spaced apart from the fourth surface in the direction opposite the first surface.

10. The interior panel of claim 9, wherein the overhang backing panel portion has a hole formed therethrough, and wherein the shaft portion has a shaft intermediate section that engages the second fastener and extends from the shaft intermediate section through the hole to a shaft end section.

11. The interior panel of claim 10, wherein the backing panel has a fifth surface that faces towards the fourth surface, and wherein the board assembly further includes a third fastener that is abutted against the fifth surface and that is disposed about and engages the shaft portion.

12. The interior panel of claim 11, wherein the backing panel has a sixth surface that is disposed opposite the fifth surface, and wherein the board assembly further includes a fourth fastener that is abutted against the sixth surface and that is disposed about and engages the shaft portion proximate the shaft end section.

13. The interior panel of claim 1, wherein the board assembly further includes a film layer that is disposed between the light source and the second surface, and wherein the light source is operative to generate the light having a color and the film layer is configured to alter the color of the light when the light passes through the film layer.

14. A vehicle comprising:
   a vehicle structure having an interior; and an interior panel that is disposed in the interior, the interior panel comprising:
  an outer covering having a first surface that is exposed to the interior and a second surface that is disposed opposite the first surface, wherein the second surface has a pattern formed therein that is covered by the first surface;
  a board assembly that is disposed proximate the second surface and that has a third surface that faces towards the second surface, wherein the board assembly includes a light source that is generally aligned with the pattern and that is operative to generate light; and
  an adhesive layer that is disposed between the second surface and the third surface and that couples the second surface and the third surface together, wherein when the light source generates the light, the light passes through the adhesive layer and the pattern to produce an illuminated pattern on the first surface,
  wherein the interior panel includes a first sidewall and a second sidewall that each extend transversely from the second surface in a direction opposite the first surface and that are spaced apart from each other to define an opening therebetween, and wherein the board assembly and the adhesive layer are disposed in the opening.

15. The vehicle of claim 14, wherein the illuminated pattern is produced on an area of the first surface, and wherein board assembly further includes a capacitive sensor that is disposed proximate the second surface and that is configured to generate a capacitance change signal in response to change in capacitance of the capacitive sensor when an object is proximate to the area of the first surface, and wherein the board assembly further includes a controller in communication with the capacitive sensor to receive the capacitance change signal and configured to direct the light source to generate the light in response to the capacitance change signal.

16. A method for making an interior panel for an interior of a vehicle, the method comprising the steps of:
  obtaining an outer covering having a first surface that is configured to be exposed to the interior of the vehicle and a second surface that is disposed opposite the first surface and that has a pattern formed therein that is covered by the first surface;
  obtaining a board assembly that includes a light source that is operative to generate light; and
  coupling a third surface of the board assembly to the second surface with an adhesive layer, wherein the light source is generally aligned with the pattern, and wherein when the light source generates the light, the light passes through the adhesive layer and the pattern to produce an illuminated pattern on the first surface,
  wherein a first sidewall and a second sidewall each extend transversely from the second surface in a direction opposite the first surface and that are spaced apart from each other to define an opening therebetween, and wherein the board assembly and the adhesive layer are disposed in the opening.

17. The method of claim 16, wherein coupling further includes disposing an adhesive between the second surface and the third surface.

18. The method of claim 17, wherein coupling further includes drying and/or curing the adhesive to form the adhesive layer.

19. The method of claim 16, wherein coupling further includes forming the adhesive layer as one of a translucent adhesive layer, a transparent adhesive layer, and a combination thereof.

\* \* \* \* \*